UNITED STATES PATENT OFFICE.

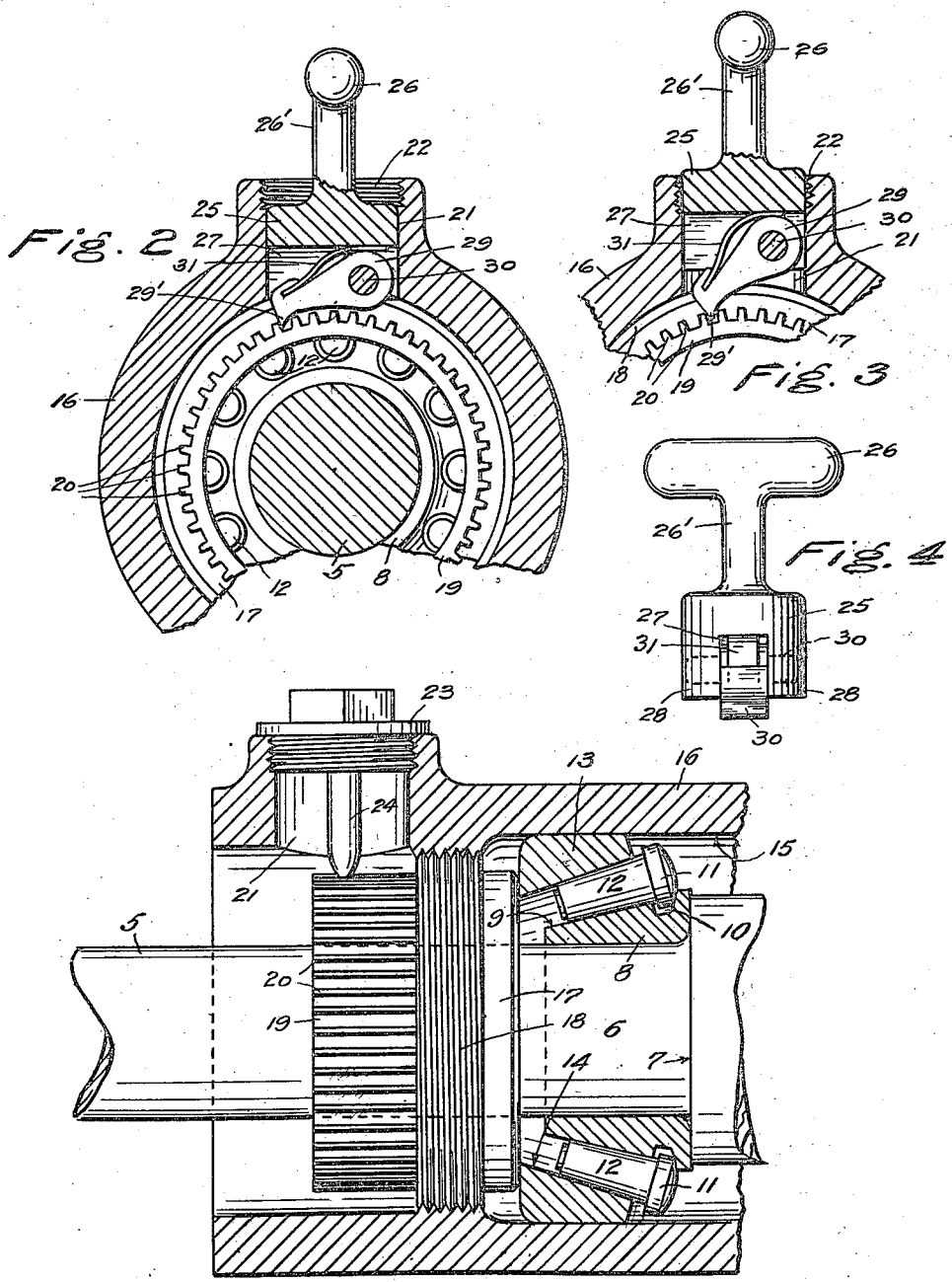

WILLIAM O. KUHN, OF SEATTLE, WASHINGTON.

ROLLER-BEARING.

1,259,751.  Specification of Letters Patent.  Patented Mar. 19, 1918.

Application filed September 4, 1917. Serial No. 189,629.

*To all whom it may concern:*

Be it known that I, WILLIAM O. KUHN, a citizen of the United States, residing at Seattle, in the county of King and State of Washington, have invented certain new and useful Improvements in Roller-Bearings, of which the following is a specification.

This invention relates to roller bearings and, more especially, to devices for adjusting the wear-rings to compensate for wear.

The object of the present invention is the perfecting of the above-mentioned adjusting devices with a view to improving the durability, utility and efficiency of the bearing.

The invention consists in the novel construction, adaptation and combination of parts, as will be hereinafter described and claimed.

In the accompanying drawings, Figure 1 is a view partly in longitudinal section and partly in side elevation of a roller bearing embodying the locking features of my invention. Fig. 2 is a transverse sectional view of the same with the follower regulator applied. Fig. 3 is a fragmentary transverse sectional view with the regulator in a different position from that in which it is represented in Fig. 2. Fig. 4 is an end elevational view of the regulator shown detached.

Referring to the drawings, 5 represents a shaft having a journal 6 which terminates at a shoulder 7. Mounted on said journal is a bushing 8 tapered exteriorly, as at 9, and provided near its end of greater diameter with a peripheral groove 10 into which extend the heads 11 of conical rollers 12.

Encircling said rollers is a wear-ring 13 having an internal tapering bore 14 and with a cylindrical external surface to fit against, preferably, the inner peripheral surface 15 of box 16. The end of the wear-ring 13 protrudes beyond the smaller ends of the rollers into juxtaposition with an end of an annular follower 17 having external screw threads 18 engaging in threads provided in the peripheral wall of the box. Said follower is also provided with a portion 19 formed with spur teeth 20 whereby the hereinafter described regulating and locking devices may be utilized to perform their respective offices. To such ends, the box 16 is provided in its peripheral wall with a circular aperture 21 disposed radially of the axis of said follower. At its outer end said aperture is provided with screw threads 22 for engagement with the threads of a plug 23 (Fig. 1) having an axially disposed stud 24 with a pointed extremity which is engageable against one of the teeth 20 of the follower, and serves as a locking device to prevent any accidental turning of the latter.

The referred-to regulator comprises a cylindrical block 25 adapted for reciprocatory movements in the box aperture 21 by means of a handle bar 26 upon the outer end of a shank 26¹ extending from the upper end of the block. The lower end of the block is provided with a slot 27 extending diametrically thereacross between bifurcations 28.

29 represents a dog operable within the slot 27 and pivotally connected from near one of its ends to a pin 30 which is secured in the block bifurcations. The other end of said dog is formed with a relatively sharp bill 29¹. Spring 31 is provided in slot 27 and tends to yieldingly press the dog downwardly out of the slot.

The operation of the invention is as follows:—

To set up or remove any looseness occurring in the bearing, the plug 23 is removed and the regulator introduced into the aperture 21, as shown in Fig. 3, so that the bill 29¹ of the dog 29 will abut against one of the follower teeth 20. The operator then, through the agency of the handle 26, forces the regulator downwardly into the position in which it is shown in Fig. 2, resulting in the follower being turned through the instrumentality of the dog.

The spring 30 is then allowed to assert its power to raise the block into Fig. 3 position with a corresponding return of the dog to the position therein illustrated. By successively pushing or forcing the block down, the teeth of the follower are successively engaged and caused to progressively rotate the follower and advance the same to take up looseness of the bearings. The regulator, moreover, by being suitably placed in the box aperture, may be used in retracting the follower as, for example, when the rollers are to be cleaned or replaced.

The invention is very simple in its construction, and may be conveniently and effectually used for the purposes described.

What I claim, is—

1. In apparatus of the class described, the combination with the bearing rollers, a containing box therefor, a wear-ring provided for said rollers, and a follower having screw threads engaging screw threads provided within said box, of reciprocatory means operable in a radial direction through the peripheral wall of said box whereby said follower is rotated to effect the axial adjustment of said wear-ring.

2. In combination with a roller bearing, a box therefor provided with internal screw threads, a follower for said bearing, said follower being provided with spur teeth and also with screw threads engaging the aforesaid screw threads, said box being provided with an aperture extending substantially radially of the follower, and reciprocatory means operable within said aperture and engaging said spur teeth for effecting rotary movements of the follower to afford axial movements of the same through the instrumentality of the screw threads thereof.

3. In combination with a roller bearing, a box therefor provided with internal screw threads, a follower for said bearings, said follower being provided with spur teeth and also with screw threads engaging the aforesaid screw threads, said box being provided with a screw-threaded aperture extending substantially radially of the follower, reciprocatory means operable within said aperture and engaging said spur teeth for effecting rotary movements of the follower to afford axial movements of the same through the instrumentality of the screw threads thereof, a screw plug engaging the threads of said aperture, and a stud extending from said plug and engageable with a tooth of said follower for securing the latter against accidental movement.

4. In apparatus of the class described, a regulator comprising a block which is bifurcated by a slot extending transversely thereacross, a dog positioned in said slot, a pin connected to the block bifurcations for pivotally connecting the dog to the block, and means to operate said block.

5. In apparatus of the class described, a regulator comprising a block which is bifurcated by a slot extending transversely thereacross, a dog positioned in said slot, a pin connected to the block bifurcations for pivotally connecting the dog to the block, a spring provided in the slot for urging the free end of the dog therefrom, and means to operate said block.

6. In apparatus of the class described, a regulator comprising a block, a dog arranged transversely thereof and pivotally connected from one of its ends to the block, a spring tending to yieldingly hold the free end of the dog away from the block, and guiding means for the regulator.

Signed at Seattle, Wash., this 21st day of August 1917.

WILLIAM O. KUHN.

Witnesses:
PIERRE BARNES,
E. PETERSON.